(12) United States Patent
Jiang et al.

(10) Patent No.: US 11,905,194 B1
(45) Date of Patent: Feb. 20, 2024

(54) DEEP DENITRIFICATION TREATMENT SYSTEM FOR WASTEWATER BY ANAEROBIC-ANOXIC-OXIC BASED ON HIGH-OXYGEN THREE-PHASE CONTACT

(71) Applicant: ZHEJIANG HAIHE ENVIRONMENTAL TECHNOLOGY CO., LTD., Jinhua (CN)

(72) Inventors: Jingwei Jiang, Jinhua (CN); Fangfang Bao, Jinhua (CN); Zhenghai Jiang, Jinhua (CN)

(73) Assignee: ZHEJIANG HAIHE ENVIRONMENTAL TECHNOLOGY CO., LTD., Jinhua (CN)

( * ) Notice: Subject to any disclaimer, the term of this patent is extended or adjusted under 35 U.S.C. 154(b) by 0 days.

(21) Appl. No.: 18/326,397

(22) Filed: May 31, 2023

(30) Foreign Application Priority Data

Sep. 28, 2022 (CN) .......................... 202211190750.0

(51) Int. Cl.
*C02F 3/30* (2023.01)
*C02F 101/16* (2006.01)

(52) U.S. Cl.
CPC .......... *C02F 3/302* (2013.01); *C02F 2101/16* (2013.01); *C02F 2203/006* (2013.01); *C02F 2307/14* (2013.01)

(58) Field of Classification Search
CPC .................. C02F 3/302; C02F 2101/16; C02F 2203/006; C02F 2307/14

(Continued)

(56) References Cited

U.S. PATENT DOCUMENTS

2022/0112112 A1  4/2022  Jiang

FOREIGN PATENT DOCUMENTS

AU    2021103721 A4 *  8/2021  ................ C02F 3/30
CN    203866157 U      10/2014

(Continued)

OTHER PUBLICATIONS

WO2023019702A1_Bao_NPL.pdf (Year: 2023).*

(Continued)

*Primary Examiner* — Ekandra S. Miller-Cruz
(74) *Attorney, Agent, or Firm* — Stuart H. Mayer; Kaplan Breyer Schwarz LLP

(57) ABSTRACT

A deep denitrification treatment system for wastewater by $A^2O$ based on high-oxygen three-phase contact is provided, including an annular anaerobic treatment device, a uniform water distribution device, a high-oxygen three-phase contact biological oxidative degradation device, a nitrification liquid collecting and shunting device, an annular nitrification liquid anoxic nitrification device and a sludge sedimentation reflux clean water discharge device sequentially connected between a water inlet and a water outlet, where the annular anaerobic treatment device surrounds a periphery of the annular nitrification liquid anoxic nitrification device, the annular nitrification liquid anoxic nitrification device surrounds a periphery of the sludge sedimentation reflux clean water discharge device, and an upper part of the sludge sedimentation reflux clean water discharge device is sequentially provided with the nitrification liquid collecting and shunting device, the high-oxygen three-phase contact biological oxidative degradation device and the uniform water distribution device.

5 Claims, 2 Drawing Sheets

(58) Field of Classification Search
USPC .......................................................... 210/605
See application file for complete search history.

(56) References Cited

FOREIGN PATENT DOCUMENTS

| CN | 208327525 U | | 1/2019 | |
|---|---|---|---|---|
| CN | 212315868 U | * | 1/2021 | ................ C02F 3/02 |
| CN | 113233596 A | | 8/2021 | |
| CN | 217148724 U | * | 8/2022 | ................ C02F 3/30 |
| WO | 0170636 A1 | | 9/2001 | |
| WO | WO-2023019702 A1 | * | 2/2023 | ................ C02F 3/30 |

OTHER PUBLICATIONS

AU2021103721A4_Feng_NPL.pdf (Year: 2021).*
CN212315868U_Jiang_NPL.pdf (Year: 2021).*
CN217148724U_Zhu_translated.pdf (Year: 2022).*

* cited by examiner

DEEP DENITRIFICATION TREATMENT SYSTEM FOR WASTEWATER BY ANAEROBIC-ANOXIC-OXIC BASED ON HIGH-OXYGEN THREE-PHASE CONTACT

CROSS-REFERENCE TO RELATED APPLICATIONS

This application claims priority to Chinese Patent Application No. 202211190750.0, filed on Sep. 28, 2022, the contents of which are hereby incorporated by reference.

TECHNICAL FIELD

The application belongs to the technical field of sewage biological treatment, and in particular to a deep denitrification treatment system for wastewater by anaerobic-anoxic-oxic ($A^2O$) based on high-oxygen three-phase contact.

BACKGROUND

The existing sewage biological treatment processes and devices all have the following commonalities: each working sequence of anaerobic, facultative, oxic and sedimentation adopts an independent structure with plane stepped descent, which occupies a large area and has high cost. In anaerobic, facultative and oxic processes, each monomer is usually square, rectangular or baffled groove-shaped. In anaerobic and facultative processes, submersible mixer or air micro-aeration airflow is used to stir to prevent microbial strains from settling. This stirring method has a blind angle and high energy consumption. The air micro-aeration airflow stirring dissolves oxygen in water, the basic requirement of dissolved oxygen <0.5 mg/l cannot be ensured, which will affect the treatment effect. The oxic process adopts the cultivation of biological strains in sewage, which has high energy consumption. The existing square, rectangular or baffled groove-shaped anaerobic and facultative processes and procedures all adopt water flow to advance uniformly from the inlet to the outlet, without reflux function, and the pollutant concentration drops uniformly from the inlet to the outlet, and the pollutant concentration difference between the inlet zone and the outlet zone is large, which is easy to reduce the activity of microorganisms due to high concentration impact.

There is now an integrated device for biological treatment of organic sewage containing Chemical Oxygen Demand (COD) and nitrogen in anaerobic/oxic (A/O) tower, which discloses a three-phase contact high-oxygen oxic (O) biological treatment, in which anaerobic (A) process is set at the front end of oxic process, and settling process is set at the back end of oxic process. By adopting this process, most of COD and nitrogen organics in wastewater are removed, and the discharged water is able to meet the national standards of urban sewage treatment plants, but there are still high COD and total nitrogen in wastewater, so this scheme is not suitable for treating industrial wastewater with high concentration of COD and nitrogen, and the treatment effect and energy-saving effect of anaerobic (A) process and oxic process have some room for improvement. As the requirements of national and local standards are constantly improved, clean discharge standards that are stricter than the national standards are put forward to treat discharged wastewater with high concentration of COD, ammonia nitrogen and total nitrogen or surface water environmental quality standards are desired to be implemented to treat industrial wastewater containing high concentration of COD and nitrogen. Under the situation of global peak carbon dioxide emissions and carbon neutrality, it is urgent to develop an efficient, energy-saving and land-saving deep denitrification treatment device for the sewage industry.

SUMMARY

In order to solve that above problems, the application provides a deep denitrification treatment system for wastewater by $A^2O$ based on high-oxygen three-phase contact, and the total nitrogen in the sewage is able to meet the requirements of national first-class discharge standards or local clean discharge standard only by carrying out one-time lifting of anoxic nitrification mixed liquid, one-time stirring internal reflux in anaerobic and anoxic process, one-time sedimentation and sludge reflux treatment on the sewage.

The deep denitrification treatment system for the wastewater by $A^2O$ based on the high-oxygen three-phase contact provided by the application includes an annular anaerobic treatment device, a uniform water distribution device, a high-oxygen three-phase contact biological oxidative degradation device, a nitrification liquid collecting and shunting device, an annular nitrification liquid anoxic nitrification device and a sludge sedimentation reflux clean water discharge device which are sequentially connected between a water inlet and a water outlet. The annular anaerobic treatment device surrounds a periphery of the annular nitrification liquid anoxic nitrification device, the annular nitrification liquid anoxic nitrification device surrounds a periphery of the sludge sedimentation reflux clean water discharge device, and an upper part of the sludge sedimentation reflux clean water discharge device is sequentially provided with the nitrification liquid collecting and shunting device, the high-oxygen three-phase contact biological oxidative degradation device and the uniform water distribution device. The high-oxygen three-phase contact biological oxidative degradation device is used for converting ammonia nitrogen in wastewater into nitrate nitrogen after nitrification reaction in an oxic process, and the annular nitrification liquid anoxic nitrification device is used for carrying out anoxic denitrification reaction on the nitrate nitrogen under a condition of having a carbon source to generate nitrogen dioxide and nitrogen to realize deep denitrification.

Optionally, in the deep denitrification treatment system for the wastewater by $A^2O$ based on the high-oxygen three-phase contact, the annular anaerobic treatment device includes an annular anaerobic reaction zone, where an upper part of a side of the annular anaerobic reaction zone is provided with the water inlet, and a lower part of the side is provided with an anaerobic zone water exit, an odor exhaust pipe and an overhaul cover port are provided on the cover plate in annular anaerobic reaction zone, and a first submersible mixer is arranged inside, and the anaerobic zone water exit is connected to a first end of a lifting pump in the anaerobic zone.

Optionally, in the deep denitrification treatment system for the wastewater by $A^2O$ based on the high-oxygen three-phase contact, the uniform water distribution device includes a first water storage tray, an inlet arranged at an outer side of the first water storage tray is connected to a second end of the anaerobic zone lifting pump, a plurality of perforations are arranged in the first water storage tray, and overflow umbrella shower heads are installed in all the perforations, and peripheries of the overflow umbrella shower heads are annular overflow rings, heights of the top ends of the overflow rings are lower than a peripheral fence, an upper opening is provided with a plurality of serrated overflow openings, and bottoms are fixed with umbrella-shaped water diversion cones through fixing strips.

Optionally, in the deep denitrification treatment system for the wastewater by A²O based on the high-oxygen three-phase contact, the high-oxygen three-phase contact biological oxidative degradation device includes a cylinder and a high-oxygen three-phase contact aerobic bioreactor located inside the cylinder, and a lower part of the side surface of the air supply area of fan is provided with an odor inlet for receiving the odor exhausted from the odor exhaust pipe, and a suspended micro-biofilm carrier filler, an upper bracket and a lower bracket are arranged inside the cylinder. A bottom of the lower bracket is a ventilation area communicated with the odor inlet, a bottom of the ventilation area is a nitrification liquid collecting tank, and an upper part of the upper bracket is the uniform water distribution device.

Optionally, in the deep denitrification treatment system for the wastewater by A²O based on the high-oxygen three-phase contact, the nitrification liquid collecting and shunting device includes a nitrification liquid collecting tank and a nitrification liquid shunting tank, where a cylinder of the nitrification liquid collecting tank is an extension of the cylinder of the high-oxygen three-phase contact biological oxidative degradation device. A fence is arranged around the cylinder of the nitrification liquid collecting tank to form a second water storage tray, an elevation of a bottom plate of the second water storage tray is 10 cm to 50 cm lower than an elevation of a sludge sedimentation overflow tank, and an outside of the second water storage tray is provided with a nitrification liquid discharge pipe port. A height of a bottom of the nitrification liquid discharge pipe port is set at a position of 10 cm to 50 cm above the bottom plate of the second water storage tray, an outer end of the nitrification liquid discharge pipe port is connected with a water inlet of the nitrification liquid shunting tank arranged above the annular nitrification liquid anoxic nitrification device. The nitrification liquid shunting tank is arranged above the annular nitrification liquid anoxic nitrification device, and a plane shape is a sector-shaped ring with the same projection as the annular nitrification liquid anoxic nitrification device, and a central angle of the sector is 30° to 180°. A bottom plate of the nitrification liquid shunting tank is an intermediate partition connecting an inner wall of the annular anaerobic treatment device and a cylinder wall of a sedimentation pond. The nitrification liquid shunting tank is provided with two shunting water pipes, with one arranged at a bottom of the bottom plate of the nitrification liquid shunting tank and extending to 10 cm to 100 cm above a bottom of the annular nitrification liquid anoxic nitrification device, and the other arranged at an outer wall of the nitrification liquid shunting tank and bending to extend to 10 cm to 100 cm above a bottom of the annular anaerobic treatment device.

Optionally, in the deep denitrification treatment system for the wastewater by A²O based on the high-oxygen three-phase contact, the annular nitrification liquid anoxic nitrification device includes an annular water pond, where a part area of an upper portion of the water pond is provided with the nitrification liquid shunting tank. A portion without the nitrification liquid shunting tank is provided with a cover plate at an upper opening of the water pond. The cover plate is provided with an overhaul movable cover plate and the upper part of the bottom plate at the bottom of the water body is provided with a second submersible mixer.

Optionally, in the deep denitrification treatment system for the wastewater by A²O based on the high-oxygen three-phase contact, the sludge sedimentation reflux clean water discharge device includes a sedimentation cylinder, where a first communication pipe with one end fixedly connected with a water exit of the nitrification liquid shunting tank and the other end fixedly connected with a central cylinder is arranged in a middle of the sedimentation cylinder. A bottom of the sedimentation cylinder is provided with a sludge discharge pipe. One end of the sludge discharge pipe is fixedly connected with a sludge discharge port of a sludge hopper, and the other end of the sludge discharge pipe passes through the sludge sedimentation reflux clean water discharge device, the annular nitrification liquid anoxic nitrification device and the annular anaerobic treatment device and then is connected with the sludge discharge control valve. The central cylinder, a conical water baffle and an annular peripheral overflow tank are arranged in the middle of the sedimentation cylinder. A bottom of the annular peripheral overflow tank is provided with a clean water discharge pipe port. The clean water discharge pipe port passes through the sludge sedimentation reflux clean water discharge device and the annular nitrification liquid anoxic nitrification device, annular anaerobic treatment device and then is connected with a standard discharge port.

From the above description, it can be seen that the deep denitrification treatment system for the wastewater by A²O based on the high-oxygen three-phase contact provided by the application includes the annular anaerobic treatment device, the uniform water distribution device, the high-oxygen three-phase contact biological oxidative degradation device, the nitrification liquid collecting and shunting device, the annular nitrification liquid anoxic nitrification device and the sludge sedimentation reflux clean water discharge device which are sequentially connected between the water inlet and the water outlet. The annular anaerobic treatment device surrounds the periphery of the annular nitrification liquid anoxic nitrification device, the annular nitrification liquid anoxic nitrification device surrounds the periphery of the sludge sedimentation reflux clean water discharge device, and the upper part of the sludge sedimentation reflux clean water discharge device is sequentially provided with the nitrification liquid collecting and shunting device, the high-oxygen three-phase contact biological oxidative degradation device and the uniform water distribution device. The high-oxygen three-phase contact biological oxidative degradation device is used for converting ammonia nitrogen in wastewater into nitrate nitrogen after nitrification reaction in an oxic process, and the annular nitrification liquid anoxic nitrification device is used for carrying out anoxic denitrification reaction on the nitrate nitrogen under a condition of having a carbon source to generate nitrogen dioxide and nitrogen to realize deep denitrification. Therefore, the total nitrogen in the sewage is able to meet the requirements of national first-class discharge standards or local clean discharge standard only by carrying out one-time lifting of anoxic nitrification mixed liquid, one-time stirring internal reflux in anaerobic and anoxic process, one-time sedimentation and sludge reflux treatment on the sewage.

BRIEF DESCRIPTION OF THE DRAWINGS

In order to more clearly explain the embodiment of the present application or the technical scheme, the attached drawings needed in the description of the embodiment will be briefly introduced below. Obviously, the attached drawings in the following description are only the embodiment of the present application. For ordinary technicians in the field, on the premise of not paying creative labor, other drawings may also be obtained according to the drawings provided by the present application.

DETAILED DESCRIPTION OF THE EMBODIMENTS

The core of the application is to provide a deep denitrification treatment system for wastewater by $A^2O$ based on high-oxygen three-phase contact, which makes the total nitrogen in sewage meet the requirements of national first-class discharge standards or local clean discharge standards only by carrying out one-time lifting of anoxic nitrification mixed liquid, one-time stirring internal reflux, one-time sedimentation and sludge reflux treatment on sewage.

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

Figure 1:
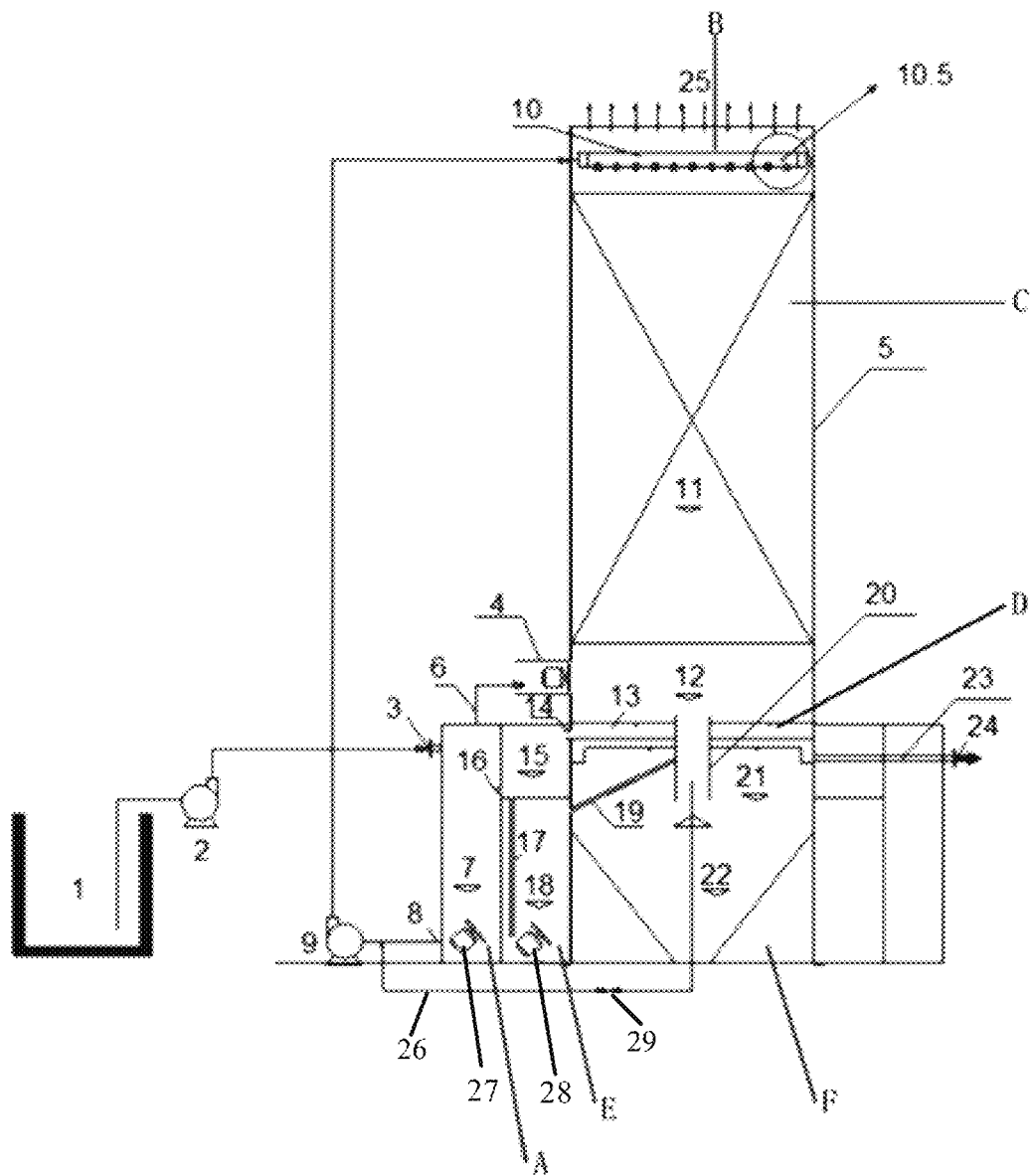
FIG. 1 is a schematic diagram of an embodiment of a deep denitrification treatment system for wastewater by $A^2O$ based on high-oxygen three-phase contact according to the application.

FIG. 1 is a schematic diagram of an embodiment of a deep denitrification treatment system for wastewater by $A^2O$ based on high-oxygen three-phase contact according to the application. The deep denitrification treatment system for wastewater by $A^2O$ based on high-oxygen three-phase contact includes an annular anaerobic treatment device A, a uniform water distribution device B, a high-oxygen three-phase contact biological oxidative degradation device C, a nitrification liquid collecting and shunting device D, an annular nitrification liquid anoxic nitrification device E and a sludge sedimentation reflux clean water discharge device F sequentially connected between a water inlet and a water outlet. The annular anaerobic treatment device A surrounds a periphery of the annular nitrification liquid anoxic nitrification device E, the annular nitrification liquid anoxic nitrification device E surrounds a periphery of the sludge sedimentation reflux clean water discharge device F, and an upper part of the sludge sedimentation reflux clean water discharge device F is sequentially provided with the nitrification liquid collecting and shunting device D, the high-oxygen three-phase contact biological oxidative degradation device C and the uniform water distribution device B. The high-oxygen three-phase contact biological oxidative degradation device C is used for converting ammonia nitrogen in wastewater into nitrate nitrogen after a nitrification reaction in an oxic process, and the annular nitrification liquid anoxic nitrification device E is used for carrying out an anoxic denitrification reaction on the nitrate nitrogen under a condition of having a carbon source to generate nitrogen dioxide and nitrogen to realize deep denitrification.

It should be noted that the treatment system adopts three core processes: first-stage anaerobic+first-stage oxic+second-stage anoxic, and these devices are built into a tower shape, which saves land and cost. Moreover, the water flow with annular design forms a low-speed fluid in the annular ring, which has low flow resistance and low energy consumption for sedimentation and propulsion. Moreover, the reflux ratio from the outlet area to the inlet area is high, the mixing interval of pollutants in the inlet area is short, and the concentration gradient of pollutants from the inlet mixing area to the outlet is small, so the microbial activity is high and the impact resistance is strong.

Through above description, it can be seen that the deep denitrification treatment system for the wastewater by $A^2O$ based on the high-oxygen three-phase contact provided by the application includes the annular anaerobic treatment device, the uniform water distribution device, the high-oxygen three-phase contact biological oxidative degradation device, the nitrification liquid collecting and shunting device, the annular nitrification liquid anoxic nitrification device and the sludge sedimentation reflux clean water discharge device which are sequentially connected between the water inlet and the water outlet. The annular anaerobic treatment device surrounds the periphery of the annular nitrification liquid anoxic nitrification device, the annular nitrification liquid anoxic nitrification device surrounds the periphery of the sludge sedimentation reflux clean water discharge device, and the upper part of the sludge sedimentation reflux clean water discharge device is sequentially provided with the nitrification liquid collecting and shunting device, the high-oxygen three-phase contact biological oxidative degradation device and the uniform water distribution device. The high-oxygen three-phase contact biological oxidative degradation device is used for converting ammonia nitrogen in wastewater into nitrate nitrogen after nitrification reaction in an oxic process, and the annular nitrification liquid anoxic nitrification device is used for carrying out anoxic denitrification reaction on the nitrate nitrogen under a condition of having a carbon source to generate nitrogen dioxide and nitrogen to realize deep denitrification. Therefore, the total nitrogen in the sewage is able to meet the requirements of national first-class discharge standards or local clean discharge standard only by carrying out one-time lifting of anoxic nitrification mixed liquid, one-time stirring internal reflux in anaerobic and anoxic process, one-time sedimentation and sludge reflux treatment on the sewage.

In a specific embodiment of the deep denitrification treatment system for the wastewater by $A^2O$ based on the high-oxygen three-phase contact mentioned above, the annular anaerobic treatment device A includes an annular anaerobic reaction zone 7. The annular anaerobic reaction zone 7 may specifically be an annular closed water pond arranged on an outer ring of the high-oxygen three-phase contact biological oxidative degradation device C. An upper part of a side of the annular anaerobic reaction zone 7 is provided with the water inlet 3. The other end of the water inlet 3 is connected with the water inlet lifting pump 2, and the water inlet lifting pump 2 is connected with a regulating pond 1. A lower part of the side of the annular anaerobic reaction zone 7 is provided with an anaerobic zone water exit 8. The anaerobic zone water exit 8 is connected with an anaerobic zone lifting pump 9. An upper surface of the cover plate of anaerobic and anoxic zone is provided with an odor exhaust pipe 6 and an overhaul cover port (not shown). The odor exhaust pipe 6 is connected with the empty odor inlet 4 at the bottom of the high-oxygen three-phase contact biological oxidative degradation device C, and a first submersible mixer 27 is arranged inside, and the anaerobic zone water exit 8 is connected to a first end of an anaerobic zone lifting pump 9. The inner wall of the annular anaerobic reaction zone 7 is shared with the outer wall of the annular nitrification liquid anoxic nitrification device E.

It should be noted that the function of the annular anaerobic treatment device A is under anaerobic conditions, to hydrolyze and acidify high molecular refractory organic substances into small molecular degradable organic substances, and to convert nitrate nitrogen in the reflux liquid of the high-oxygen three-phase contact biological oxidative degradation device C into nitrogen, nitrogen dioxide and carbon dioxide under anaerobic conditions with sufficient carbon sources. The annular anaerobic treatment device A has following advantages: the water flow with annular design forms a low-speed fluid in the annular ring, which has low flow resistance and low energy consumption for sedimentation and propulsion. Moreover, the reflux ratio from the outlet area to the inlet area is high, the mixing interval of pollutants in the inlet area is short, and the concentration gradient of pollutants from the inlet mixing area to the outlet is small, so the microbial activity is high and the impact resistance is strong.

Figure 2:
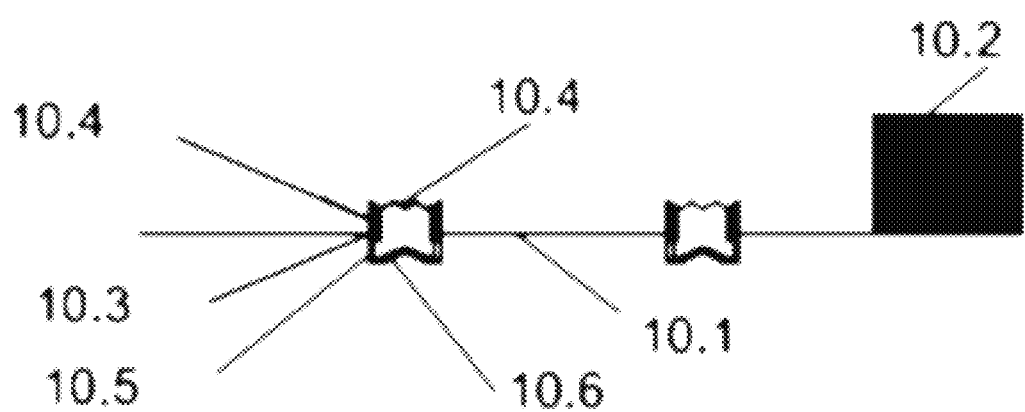
FIG. 2 is a partial schematic diagram of a uniform water distribution device of a deep denitrification treatment system for wastewater by $A^2O$ based on high-oxygen three-phase contact.

In the existing commonly used high-oxygen three-phase contact biological oxidation technology, no accumulated wastewater enters the oxidation zone in the three-phase contact biological oxidation zone, and it does not have the natural dissolution and mixing function of a water-accumulating pond, so uniform water distribution becomes the key process for uniform water flow in the aerobic biological oxidation zone and the full play of the contact absorption and degradation function of microorganisms suspended in the zone. The existing uniform water distribution process of spray tower is usually equipped with multiple pressure nozzles, perforated spray pipes and overflow tanks, etc. Because the treated wastewater contains a lot of sludge and other suspended substances, the nozzles and perforated spray pipes are easily blocked, so the nozzles and perforated spray pipes are not suitable. However, if the overflow tank is too dense, the system is complicated, the construction investment cost is high and the operation is difficult. In view of these problems, the present application provides another embodiment of the deep denitrification treatment system for wastewater by $A^2O$ based on high-oxygen three-phase contact, as shown in FIG. 1 and FIG. 2. FIG. 2 is a partial schematic diagram of a uniform water distribution device of a deep denitrification treatment system for wastewater by $A^2O$ based on high-oxygen three-phase contact. The cylinder of the uniform water distribution device B may be an upward extension of the cylinder of the high-oxygen three-phase contact biological oxidative degradation device C, and may include a first water storage tray 10 formed by a fence which is arranged around the cylinder and is consistent with the cylinder. The first water storage tray 10 includes a water storage tray bottom plate 10.1 and a water storage tray peripheral wall 10.2. An inlet arranged at the outer side of the first water storage tray 10 is connected to the second end of the anaerobic zone lifting pump 9, and a plurality of perforations 10.3 are arranged in the first water storage tray 10, and the diameter of the perforations may be 2 cm-10 cm. The perforations 10.3 are all equipped with overflow umbrella shower heads, and the peripheries of the overflow umbrella shower heads are annular overflow rings, which may be circular rings or square rings. The heights of the tops of the overflow rings are lower than the peripheral fence, and the upper opening is provided with a plurality of serrated overflow openings 10.4, and the bottoms are fixed with umbrella-shaped water diversion cones 10.6 through fixing strips 10.5. An exhaust port 25 is arranged above the first water storage tray 10 for discharging purified gas.

It should be noted that the combined overflow umbrella shower uniform water distribution device adopted here has the advantages of large flux of sludge and suspended substances, no blockage, no need for pipeline transportation in the whole water distribution project, low resistance, low energy consumption and less head loss, and the density of overflow umbrella shower heads may be adjusted according to the water distribution density requirements, so as to achieve high uniformity of water flow per unit area in the biological oxidation zone.

In another specific embodiment of the deep denitrification treatment system for the wastewater by $A^2O$ based on the high-oxygen three-phase contact mentioned above, the high-oxygen three-phase contact biological oxidative degradation device C includes a cylinder 5 and a high-oxygen three-phase contact aerobic bioreactor 11 located inside the cylinder 5, and a lower part of the side surface of the air supply area of fan is provided with an odor inlet 4. The odor here refers to one or a mixture of odor with an oxygen concentration of more than 10% and fresh air, and the position of the odor inlet 4 may be provided with a fan. The odor inlet 4 is used for receiving the odor exhausted from the odor exhaust pipe. A suspended micro-biofilm carrier filler, an upper bracket and a lower bracket are arranged inside the cylinder. Fillers with high density and high specific surface area may be used here. A bottom of the lower bracket is a ventilation area 12 communicated with the odor inlet 4, a bottom of the ventilation area 12 is a nitrification liquid collecting tank, and an upper part of the upper bracket is the uniform water distribution device B.

It should be noted that the high-oxygen three-phase contact biological oxidative degradation device C nitrifies ammonia nitrogen in sewage into nitrate nitrogen under the action of aerobic organisms, so that the organic matter is converted into carbon dioxide, and the malodorous gas generated by anaerobic and anoxic processes is cooperatively treated. Its advantages include: adopting non-water accumulated type high-specific surface biological membrane technology, high aerobic bacteria density, no blockage, high volume load, using oxygen-containing odor and atmospheric air as oxygen sources, high oxygen concentration and low oxygen supply energy consumption and low noise. Moreover, this high-oxygen three-phase contact biological oxidative degradation device C is built on top of other devices, forming an integrated tower structure, occupying less land, and jointly treats wastewater and malodorous gas.

In another specific embodiment of the deep denitrification treatment system for the wastewater by $A^2O$ based on the high-oxygen three-phase contact, the nitrification liquid collecting and shunting device D includes a nitrification liquid collecting tank and a nitrification liquid shunting tank, where a cylinder of the nitrification liquid collecting tank may an extension of the cylinder of the high-oxygen three-phase contact biological oxidative degradation device. A fence is arranged around the cylinder of the nitrification liquid collecting tank to form a second water storage tray 13, an elevation of a bottom plate of the second water storage tray 13 is 10 cm to 50 cm lower than that of a sludge sedimentation overflow tank, and an outside of the second water storage tray 13 is provided with a nitrification liquid discharge pipe port 14. A height of a bottom of the nitrification liquid discharge pipe port 14 is set at a position of 10 cm to 50 cm above the bottom plate of the second water storage tray 13, an outer end of the nitrification liquid discharge pipe port 14 is connected with a water inlet of the nitrification liquid shunting tank 15 arranged above the annular nitrification liquid anoxic nitrification device E. The nitrification liquid shunting tank 15 is arranged above the annular nitrification liquid anoxic nitrification device E, and a plane shape is a sector-shaped ring with the same projection as the annular nitrification liquid anoxic nitrification device E, and a central angle of the sector is 30° to 180°. A bottom plate of the nitrification liquid shunting tank 15 is an intermediate partition connecting an inner wall of the annular anaerobic treatment device A and a cylinder wall of a sedimentation pond. The nitrification liquid shunting tank 15 is provided with two shunting water pipes, with one 17 arranged at a bottom of the bottom plate of the nitrification liquid shunting tank 15 and extending to 10 cm to 100 cm above a bottom of the annular nitrification liquid anoxic nitrification device E, and the other 16 arranged at an outer wall of the nitrification liquid shunting tank 15 and bending to extend to 10 cm to 100 cm above a bottom of the annular anaerobic treatment device A.

It should be noted that the nitrification liquid collecting and shunting device D collects nitrification liquid dripping from the high-oxygen three-phase contact biological oxidative degradation device C, and the collected nitrification liquid may adopts non-powered way and is automatically shunted and matched according to the total water inflow of the treatment system and the reflux of the anaerobic process, so that through shunting, part of the nitrification liquid flows into the anoxic process by itself, and the other part flows back into the anaerobic process, thus realizing automatic shunting.

In an optional embodiment of the deep denitrification treatment system for the wastewater by A²O based on the high-oxygen three-phase contact, the annular nitrification liquid anoxic nitrification device E may include an annular water pond 18. The inner wall of the water pond 18 is shared with the outer wall of the sludge sedimentation reflux clean water discharge device E, and the outer wall of the water pond 18 is shared with the outer wall of the annular anaerobic treatment device A. A part area of an upper portion of the water pond 18 is provided with the nitrification liquid shunting tank 15. A portion without the nitrification liquid shunting tank 15 is provided with a cover plate at an upper opening of the water pond. The cover plate is provided with an overhaul movable cover plate and a bottom is provided with a second submersible mixer 28 for prevent biological strains from sinking.

It should be noted that ammonia nitrogen in the nitrification liquid from the nitrification liquid shunting tank 15 has been basically removed and converted into nitrate nitrogen. Under the condition of no other ammonia nitrogen input, through action of anoxic bacteria in the anoxic process, the nitrate nitrogen in the nitrification liquid will undergo denitrification under the condition of enough carbon source, and the nitrate nitrogen is deeply removed to produce nitrogen dioxide, nitrogen and carbon dioxide, so as to achieve the effect of deeply removing total nitrogen. Moreover, water flow with the annular design forms the low-speed fluid in the annular ring, with low flow resistance, low energy consumption for sedimentation and propulsion, high reflux ratio from the outlet area to the inlet area, short mixing interval of pollutants in the inlet area, small concentration gradient of pollutants from the inlet mixing area to the outlet, high microbial activity and strong impact resistance.

In another optional embodiment of the deep denitrification treatment system for the wastewater by A²O based on the high-oxygen three-phase contact, the sludge sedimentation reflux clean water discharge device F may include a sedimentation cylinder 21, where a first communication pipe 19 with one end fixedly connected with a water exit of the nitrification liquid shunting tank 15 and the other end fixedly connected with a central cylinder 20 is arranged in a middle of the sedimentation cylinder 21. A bottom of the sedimentation cylinder 21 is provided with a sludge discharge pipe 26 with one end fixedly connected with a sludge discharge port of a sludge hopper 22 and the other end passing through the sludge sedimentation reflux clean water discharge device F, the annular nitrification liquid anoxic nitrification device E and the annular anaerobic treatment device A and then connecting with the sludge discharge control valve 29. The central cylinder 20, a conical water baffle 22 and an annular peripheral overflow tank are arranged in the middle of the sedimentation cylinder 21. A bottom of the annular peripheral overflow tank is provided with a clean water discharge pipe port 23. The clean water discharge pipe port 23 passes through the sludge sedimentation reflux clean water discharge device F and the annular nitrification liquid anoxic nitrification device E, annular anaerobic treatment device A and then is connected with a standard discharge port 24.

It should be noted that the sludge sedimentation reflux clean water discharge device F is able to separate sludge from water in the mixture of the sludge and water from the anoxic process by gravity sedimentation, and discharge the clean water. Part of the sedimented sludge flows back to the main water inlet pipe through the first communication pipe and the sludge discharge control valve, and part of the sedimented sludge flows back to the anoxic process through the first communication pipe, the sludge discharge control valve and the booster pump, and the excess sludge is discharged into the sludge pool for subsequent treatment.

The above description of the disclosed embodiments enables those skilled in the field to realize or use the application. Many modifications to these embodiments will be obvious to those skilled in the field, and the general principles defined herein may be implemented in other embodiments without departing from the spirit or scope of the application. Therefore, the present application is not to be limited to the embodiments shown herein, but is to be accorded the widest scope consistent with the principles and novel features disclosed herein.

What is claimed is:

1. A denitrification treatment system for wastewater by anaerobic-anoxic-oxic (A²O) based on high-oxygen three-phase contact, comprising an annular anaerobic treatment device, a uniform water distribution device, a high-oxygen three-phase contact biological oxidative degradation device, a nitrification liquid collecting and shunting device, an annular nitrification liquid anoxic nitrification device and a sludge sedimentation reflux clean water discharge device sequentially connected along a wastewater treatment flow direction between a water inlet and a water outlet, wherein the annular anaerobic treatment device surrounds a periphery of the annular nitrification liquid anoxic nitrification device, the annular nitrification liquid anoxic nitrification device surrounds a periphery of the sludge sedimentation reflux clean water discharge device, and an upper part of the sludge sedimentation reflux clean water discharge device is sequentially provided from bottom to top with the nitrification liquid collecting and shunting device, the high-oxygen three-phase contact biological oxidative degradation device and the uniform water distribution device; the high-oxygen three-phase contact biological oxidative degradation device is used for converting ammonia nitrogen in the wastewater into nitrate nitrogen after a nitrification reaction in an oxic process, and the annular nitrification liquid anoxic nitrification device is used for carrying out an anoxic denitrification reaction on the nitrate nitrogen under a condition of having a carbon source to generate nitrogen dioxide and nitrogen to realize denitrification, wherein the annular anaerobic treatment device comprises an annular anaerobic reaction zone, an upper part of a side of the annular anaerobic reaction zone is provided with the water inlet, a lower part of the side is provided with an anaerobic zone water exit, an upper surface of a cover plate of the annular anaerobic reaction zone is provided with an odor exhaust pipe and an overhaul cover port, a first submersible mixer is arranged inside the annular anaerobic reaction zone, and the anaerobic zone water exit is connected to a first end of an anaerobic zone lifting pump, wherein the uniform water distribution device comprises a first water storage tray, an inlet arranged at an outer side of the first water storage tray is connected to a second end of the anaerobic zone lifting pump, a plurality of perforations are arranged in the first water storage tray, overflow umbrella shower heads are installed in all the perforations, peripheries of the overflow umbrella shower heads are annular overflow rings, heights of top ends of the overflow rings are lower than a peripheral fence, upper openings of the overflow rings are provided with a plurality of serrated overflow openings, and bottoms of the overflow rings are fixed with umbrella-shaped water diversion cones through fixing strips.

2. The denitrification treatment system for the wastewater by the $A^2O$ based on the high-oxygen three-phase contact according to claim 1, wherein the high-oxygen three-phase contact biological oxidative degradation device comprises a cylinder and a high-oxygen three-phase contact aerobic bioreactor located inside the cylinder, and a lower part of its side surface is provided with an odor inlet; the odor inlet is used for receiving odor exhausted from the odor exhaust pipe, and a suspended micro-biofilm carrier filler, an upper bracket and a lower bracket are arranged inside the cylinder; a bottom of the lower bracket is a ventilation area communicated with the odor inlet, a bottom of the ventilation area is a nitrification liquid collecting tank, and an upper part of the upper bracket is the uniform water distribution device.

3. The denitrification treatment system for the wastewater by the $A^2O$ based on the high-oxygen three-phase contact according to claim 2, wherein the nitrification liquid collecting and shunting device comprises a nitrification liquid collecting tank and a nitrification liquid shunting tank, a cylinder of the nitrification liquid collecting tank is an extension of the cylinder of the high-oxygen three-phase contact biological oxidative degradation device; a fence is arranged around the cylinder of the nitrification liquid collecting tank to form a second water storage tray, an elevation of a bottom plate of the second water storage tray is 10 cm to 50 cm lower than an elevation of a sludge sedimentation overflow tank, and an outside of the second water storage tray is provided with a nitrification liquid discharge pipe port, a height of a bottom of the nitrification liquid discharge pipe port is set at a position of 10 cm to 50 cm above the bottom plate of the second water storage tray, an outer end of the nitrification liquid discharge pipe port is connected with a water inlet of the nitrification liquid shunting tank arranged above the annular nitrification anoxic nitrification device, the nitrification liquid shunting tank is arranged above the annular nitrification liquid anoxic nitrification device, and a plane shape is a sector-shaped ring with a same projection as the annular nitrification liquid anoxic nitrification device, and a central angle of a sector is 30° to 180°, a bottom plate of the nitrification liquid shunting tank is an intermediate partition connecting an inner wall of the annular anaerobic treatment device and a cylinder wall of a sedimentation pond, and the nitrification liquid shunting tank is provided with two shunting water pipes, a first pipe of the two shunting water pipes is arranged at a bottom of the bottom plate of the nitrification liquid shunting tank and extends to 10 cm to 100 cm above a bottom of the annular nitrification liquid anoxic nitrification device, and a second pipe of the two shunting water pipes is arranged at an outer wall of the nitrification liquid shunting tank and bends to extend to 10 cm to 100 cm above a bottom of the annular anaerobic treatment device.

4. The denitrification treatment system for the wastewater by the $A^2O$ based on the high-oxygen three-phase contact according to claim 3, wherein the annular nitrification liquid anoxic nitrification device comprises an annular water pond, a part area of an upper portion of the annular water pond is provided with the nitrification liquid shunting tank, a portion without the nitrification liquid shunting tank is provided with a cover plate at an upper opening of the annular water pond; the cover plate is provided with an overhaul movable cover plate, and a bottom is provided with a second submersible mixer.

5. The denitrification treatment system for the wastewater by the $A^2O$ based on the high-oxygen three-phase contact according to claim 4, wherein the sludge sedimentation reflux clean water discharge device comprises a sedimentation cylinder, a first communication pipe with a communication pipe first end fixedly connected with a water exit of the nitrification liquid shunting tank and a communication pipe second end fixedly connected with a central cylinder is arranged in a middle of the sedimentation cylinder, a bottom of the sedimentation cylinder is provided with a sludge discharge pipe with a sludge pipe first end fixedly connected with a sludge discharge port of a sludge hopper and a sludge pipe second end passing through the sludge sedimentation reflux clean water discharge device, the annular nitrification liquid anoxic nitrification device, and the annular anaerobic treatment device and then connecting with a sludge discharge control valve; the central cylinder, a conical water baffle and an annular peripheral overflow tank are arranged in the middle of the sedimentation cylinder, a bottom of the annular peripheral overflow tank is provided with a clean water discharge pipe port; and the clean water discharge pipe port passes through the sludge sedimentation reflux clean water discharge device, the annular nitrification liquid anoxic nitrification device, and the annular anaerobic treatment device and then is connected with a standard discharge port.

* * * * *